(12) United States Patent
Xun et al.

(10) Patent No.: US 9,806,951 B2
(45) Date of Patent: Oct. 31, 2017

(54) CLUSTER VOTER MODEL

(71) Applicant: Microsoft Technology Licensing, LLC, Redmond, WA (US)

(72) Inventors: Lu Xun, Redmond, WA (US); Alex Wun, Bellevue, WA (US); Gopala Krishna R. Kakivaya, Sammamish, WA (US); Rishi Rakesh Sinha, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 382 days.

(21) Appl. No.: 13/745,268

(22) Filed: Jan. 18, 2013

(65) Prior Publication Data
US 2014/0207925 A1 Jul. 24, 2014

(51) Int. Cl.
*H04L 12/24* (2006.01)

(52) U.S. Cl.
CPC .......... *H04L 41/0893* (2013.01); *H04L 41/30* (2013.01)

(58) Field of Classification Search
CPC ............. G06F 2209/505; G06F 9/5061; G06F 11/1425; G06F 11/2005; G06F 11/2007; G06F 2209/522; G06F 3/0622; G06F 3/0659; G06F 3/067; G06F 9/526; G06F 11/142; G06F 11/2028; G06F 11/2035; G06F 11/0709; G06F 11/2033; G06F 11/0793; G06F 11/187; G06F 11/3006; G06F 9/5072; H04L 67/104; H04L 67/1046; H04L 12/42; H04L 67/1048; H04L 29/12066; H04L 29/12113; H04L 45/04; H04L 61/1511; H04L 61/1541; H04L 41/0659; H04L 45/00; H04L 45/02; H04L 67/1065; H04L 67/1095; H04L 12/1813; H04L 12/1827; H04L 12/1836; H04L 12/1854; H04L 12/1881; H04L 12/4637; H04L 12/66; H04L 29/08135; H04L 29/12103; H04L 43/0817; H04L 45/123; H04L 63/0815; H04L 12/437; H04L 41/0893; H04L 41/30
See application file for complete search history.

(56) References Cited

U.S. PATENT DOCUMENTS

| 6,192,401 B1 * | 2/2001 | Modiri | G06F 9/5061 |
| | | | 370/254 |
| 7,362,718 B2 * | 4/2008 | Kakivaya | H04L 12/42 |
| | | | 370/254 |
| 7,698,390 B1 * | 4/2010 | Harkness | G06F 11/2046 |
| | | | 709/201 |

(Continued)

OTHER PUBLICATIONS

Ding, et al., "Bootstrapping Chord over MANETs—All Roads Lead to Rome", In the IEEE Wireless Communications and Networking Conference, Mar. 11, 2007, 5 pages.

*Primary Examiner* — Kevin Bates
*Assistant Examiner* — Ranjan Pant
(74) *Attorney, Agent, or Firm* — Workman Nydegger

(57) ABSTRACT

Determining if a new federation should be formed. A method includes a voter node determining that it has sufficient votes to form a new federation. The method further includes determining that no node existing in a previous federation already has a quorum of valid global tickets. Each global ticket indicates that a node agrees that a federation should continue to exist. As a result, the voter node forms a new federation.

20 Claims, 3 Drawing Sheets

(56) References Cited

U.S. PATENT DOCUMENTS

| | | | |
|---|---|---|---|
| 8,108,715 B1 | 1/2012 | Agarwal | |
| 8,234,518 B2 | 7/2012 | Hansen | |
| 8,275,912 B2* | 9/2012 | Kakivaya | G06F 9/5072 709/201 |
| 8,887,987 B2* | 11/2014 | Yee | G07C 13/00 235/51 |
| 2003/0002521 A1 | 1/2003 | Traversat et al. | |
| 2007/0016822 A1* | 1/2007 | Rao | G06F 9/5061 714/4.11 |
| 2008/0071878 A1* | 3/2008 | Reuter | H04L 67/1031 709/208 |
| 2008/0288646 A1 | 11/2008 | Hasha et al. | |
| 2009/0193288 A1* | 7/2009 | Kakivaya | H04L 63/20 714/4.1 |
| 2010/0106831 A1* | 4/2010 | Kakivaya | G06F 9/5072 709/225 |
| 2010/0107002 A1* | 4/2010 | Kakivaya | H04L 41/0659 714/4.1 |
| 2010/0318610 A1* | 12/2010 | Hisgen | G06F 11/0709 709/205 |
| 2011/0179231 A1* | 7/2011 | Roush | G06F 3/0622 711/152 |
| 2011/0231450 A1* | 9/2011 | Sinha | G06F 17/30566 707/802 |
| 2012/0036237 A1* | 2/2012 | Hasha | H04L 67/1095 709/221 |
| 2012/0054546 A1 | 3/2012 | Kampouris et al. | |
| 2012/0198055 A1* | 8/2012 | Falco | H04L 43/0817 709/224 |

* cited by examiner

```
class VoteProxy                                                    300
{
public:
    virtual Common::ErrorCode OnAcquire(__inout NodeConfig & ownerConfig,
        cxl::TimeSpan ttl,
        bool preempt,
        __out VoteOwnerState & state) = 0;

virtual void OnRelease() = 0;

virtual Common::ErrorCode OnSetGlobalTicket(cxl::DateTime globalTicket) = 0;
    virtual Common::ErrorCode OnSetSuperTicket(cxl::DateTime superTicket) = 0;
}
```

*Fig. 3*

CLUSTER VOTER MODEL

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Networking systems has allowed for the implementation of distributed computing systems. A distributed system may comprise a number of different separate machines (or peers) that are networked together to perform a shared computing task. Each of the peers may include a portion of an application, or an application instance that coordinates with other application instances on other peers to accomplish the common computing task.

In a distributed system, a fundamental problem is to prevent split-brain. In particular, different machines may form competing federations implementing the same distributed applications, such that a loss of coordination of control or task performance may be experienced for the same group of nodes that cooperate in a single application. As used herein, a federation is a logically organized peer to peer network. This problem is especially difficult to address when communication failure between different peer nodes can happen at any time and nodes can go down at any time.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that includes acts for determining, in a federation, if a federation exists for a node to join or if a new federation should be formed. The method includes a voter node determining that it has sufficient votes to form a new federation. The method further includes determining that no node existing in a previous federation still has a quorum of valid global tickets. Each global ticket indicates that a voter agrees that a federation should continue to exist. As a result, the voter node forms a new federation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates an internal interface of a vote proxy component.

DETAILED DESCRIPTION

Embodiments may include functionality for preventing two different federations existing at the same time for the same group of nodes that cooperate in a single application. This can be done by using unique and novel ways of determining if a federation already exists for a node to join, or if a node should form a new federation. Notably, in some embodiments, the federation may be a federated ring such as that illustrated in U.S. Pat. No. 8,014,321 titled "Rendezvousing Resource Requests With Corresponding Resources", issued on Sep. 6, 2011, which is incorporated herein by reference in its entirety.

Figure 1:
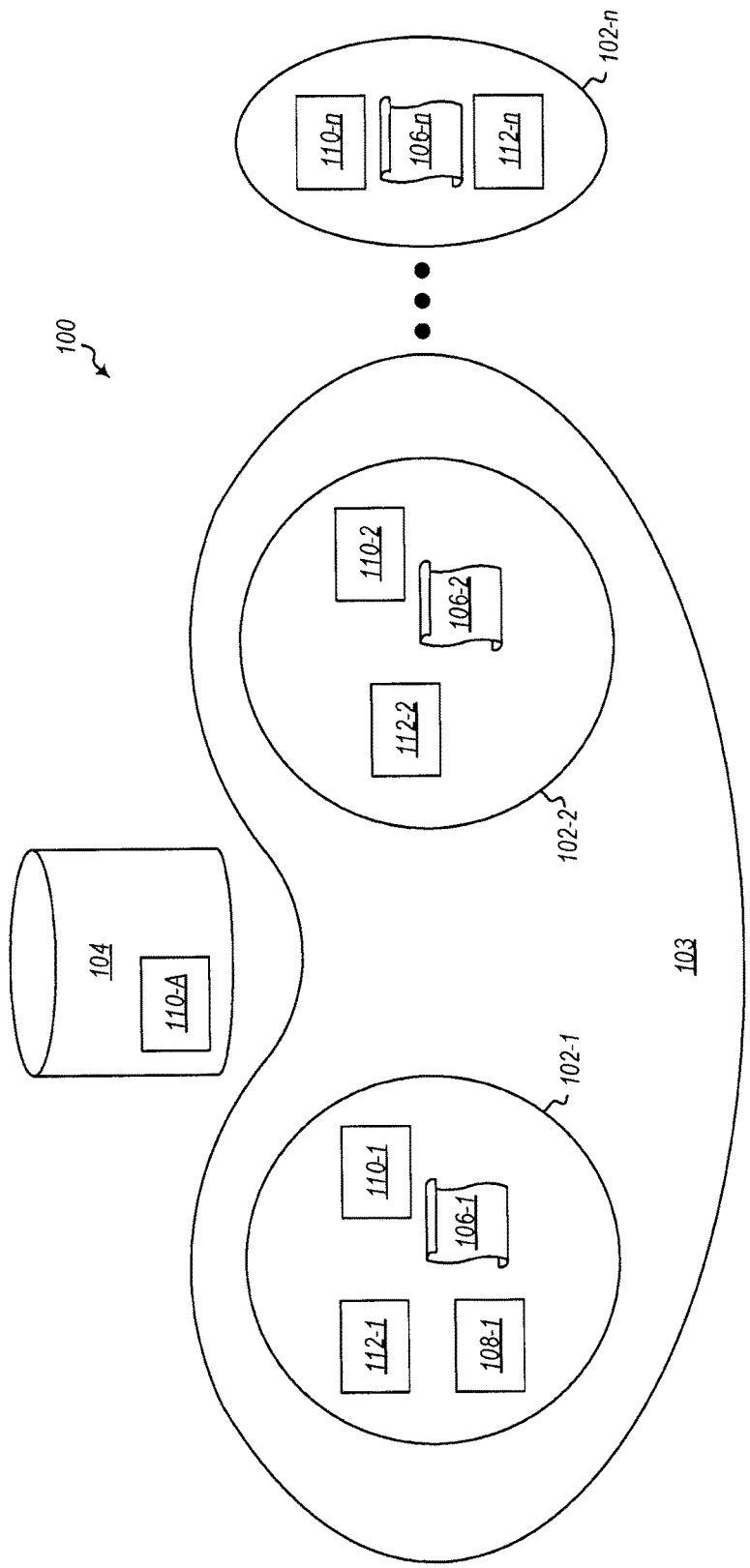
FIG. 1 illustrates nodes and a shared voter used for determining if a federation should be formed.

FIG. 1 illustrates an example of a network 100 including nodes 102-1, 102-2, through 102-n, where n is the number of nodes in the network 100 (which may be referred to herein generically as 102) that may be later joined into a federation 103. FIG. 1 also illustrates a shared voter 104, which is not a node, as explained in more detail below. Note that while only a single shared voter 104 is illustrated, embodiments may include multiple shared voters. For a node 102 to form a new federation from nodes in a network 100, it must have a sufficient number of votes from voters to form a new federation 103 and it must determine that no node existing in a previous federation has a quorum of global tickets (as explained further below). Nodes 102 may be voters, but voters do not have to be nodes, and nodes do not have to be voters. A voter can be a shared voter 104, which is voter but not a node. Examples of shared voters include disks, databases, file shares, etc. Voters can grant their votes to a node 102 that is attempting to form a federation. Global tickets document the expiration of global leases voters grant to nodes where the global leases are established relationships between nodes as described below. When a global lease is issued by a voter, in some embodiments, it is an indication that the voter issuing lease has agreed that a federation should continue. FIG. 1 illustrates that each node maintains a global lease list 106-1 and 106-2 respectively (but referred to herein generically as 106). The global lease list 106 includes a list of all global leases that a node 102 has received from other voters. For example, global lease list 106-1 lists all of the leases that node 102-1 has received from other voters in the network 100.

Currently, each external authority (shared voter 104) or seed node maps to a single vote. Seed nodes always own a vote, whereas non-seed nodes may not own any votes. Non-seed nodes can only obtain a shared/external vote if no other node has obtained that vote already. For example, a federation configured to use two seed nodes and an external disk has three votes in total. Seed node votes are relatively straightforward since each seed node simply owns a single vote (its own vote) and cannot own the vote of another seed node. However, since an external authority, referred to herein as a shared voter 104, is not a node and cannot participate in federation protocols, there needs to be a vote owner for the external vote of the shared voter 104. Unlike seed node votes, the external vote can be owned by any node 102 in the federation. The external shared voter 104 authority or "disk" could be implemented using a database server, such as a SQL Server® available from Microsoft® Corporation of Redmond Wash., a HA cluster, or a file share, each requiring different communication protocols. To hide the complexities of having heterogeneous vote authorities, embodiments include a "vote proxy" component illustrated as 110-1 through 110-n for the nodes 102-1 through 102-n and as 110-A for the shared voter 104, but referred to herein generically as 110. Vote proxies expose an interface that is common across all different vote authority types. This interface hides vote authority implementation details from the bootstrap protocol itself, which stays the same regardless of which types of vote authorities are being used in the federation 103.

External votes of a shared voter 104 also function using the concept of a vote lease where a vote owner grants their vote for a given period of time. Without such a lease, vote owners (i.e. shared voters) will need to co-ordinate vote ownership changes during bootstrap, which would add significant complexity to the bootstrap protocol. Having a vote lease avoids vote owner churn during federation bootstrap by allowing embodiments to assign external votes on a first come first serve basis. After the bootstrap phase the ownership logic can be simplified by utilizing a routing token, but a lease is still useful to resolve the conflict between a routing node and a bootstrap node. For example, a shared voter could be owned by a node in the bootstrap phase. At the same time, a node already joined in a federation could consider itself as the owner of the shared voter by means of routing token. For example, in some embodiments, each node in a federation is assigned a token that describes what "piece" of the federation the node owns. Tokens cannot overlap so no two nodes in the same federation can own overlapping "pieces" of the federation.

The following first describes the components involved in bootstrapping a federation and then describes the bootstrap protocol itself.

Global Lease Management

A node 102 in a federation must maintain valid global leases for a majority of votes available in a federation (including votes of nodes and of shared voters) in order to remain in the federation. Vote owners are responsible for issuing global leases for all votes that they own. A vote owner keeps track, in its global lease list 106) of when its last issued global lease will expire for the purposes of preventing split-brained federations if a federation restart occurs.

The authoritative expiration time of a vote's global leases is referred to as the "global ticket". A global ticket does not expire on the voter owner before it expires on any node that received the global ticket. Furthermore, updates to a global ticket are persisted by its vote owner to durable storage (e.g. a local file or database). Otherwise, a vote owner has no way of knowing the expiration time of the latest global lease it issued before rebooting. Depending on the type of the vote authority being used, global tickets may be persisted locally on the vote owning node 102 or remotely from the vote owning node 102.

Vote Owner Leader Election

Since embodiments are to avoid creating split-brained federations during bootstrap, vote owners elect a leader among themselves to start a new federation. This leader election protocol works by establishing a lease relationship that is only used among vote owners during bootstrap. When vote owner A elects vote owner B to be the leader, vote owner A generates a super ticket and issues a vote lease to B using that super ticket. For example, node 102-1 may generate a super ticket 108-1 (referred to herein generically as 108) and issue a vote lease to node 102-2. A "ticket", as used herein, is an authoritative timestamp indicating a time when a vote lease expires. This indication can be done in any one of a number of different ways. For example, the super ticket 108-1 may have the expiration time recorded. Alternatively, the super ticket 108-1 may record when the vote lease was issued and the vote lease may expire after a predetermined time after the issue time. Other configurations may be used alternatively or additionally. A vote owner can only elect one leader at a time and thus can only elect a new leader if a super ticket from a previous election decision expires. Because of this, the super ticket on A cannot expire before any vote leases issued using that ticket. Otherwise, B can mistakenly believe that it has been elected as a leader by A when in fact, that election decision has already expired on A and A has elected a new leader. For the same reason, a vote owner also persists its own super ticket 108 in case it restarts during the bootstrap phase.

A node 102 in the federation must have valid global leases for a majority of voters to stay in the federation. This means that the first node starting the federation must have some way of getting these initial global leases. This is accomplished as follows: The super ticket lease from A to B temporarily transfers ownership of A's votes to B (along with the responsibilities of vote ownership such as issuing global leases for those votes). If B acquires ownership for a majority of votes from the other seed nodes, then B can start the new federation. As B owns a majority of votes at that time, it can also issue the necessary number of global leases to itself. Note that embodiments generate and persist a super ticket 108 before it is transferred to another node so that if the node is restarted, it does not try to re-issue its super ticket before it is expired.

Vote Lease

With the introduction of external votes from shared voters 104, embodiments also introduce the concept of a vote lease as described above. The vote lease is persisted on the external vote (also called sharable vote). A new node can only acquire the vote after a previous lease to a different node has expired.

Vote Manager

In the illustrated example, all nodes instantiate a single vote manager component, illustrated as 112-1 through 112-n for the nodes 102-1 through 102-n respectively, but referred to herein generically as 112. The vote manager component 112 encapsulates all responsibilities related to the bootstrap protocol and management of owned votes (if any). A vote manager's behavior can be described using two state machines. One during bootstrap and one after bootstrap. The former will be described in the bootstrap protocol. The latter is simpler and it works as described below:

Whenever there is a routing token change, the vote manager 112 checks to see whether it has lost or gained ownership for any external vote. Every such vote has a unique node identifier. The identifier may be generated, for example, by hashing a node name. If a previously owned vote is no longer covered by its current token, it will release its ownership. Conversely, it will acquire the vote. Note that for a routing node, acquiring the ownership is in preemptive mode in the sense that vote lease is ignored because the routing token mechanism guarantees that only one node will claim the ownership. It is possible that the previous owner is still not aware of the ownership change (especially for owner in bootstrap phase). This is acceptable, however, because such owner will realize this when they try to write to the shared/external vote. The implementation of the vote storage ensures that only the owner can succeed.

Vote Proxy

There is a one-to-one correspondence between a vote proxy and a vote in the federation. That is, each vote manager 112 instantiates one vote proxy for every vote. For example, for a federation configured to use an external disk and two seed nodes, every vote manager 112 will instantiate three vote proxy components. The followings is the internal of a vote proxy component used by The vote manager component:

FIG. 3 shows the internal 300 of a vote proxy component used by the vote manager component.

OnAcquire and OnRelease are called when a node 102 attempts to acquire/release the ownership for a vote. For a seed node vote (such as votes from nodes 102), the implementation is trivial as only node identifier comparison is involved. For an external vote (such as votes from external voter 104), it is the implementation's responsibility to make sure the owner information is stored correctly and checked whenever the global or super tickets are updated.

The OnSetGlobalTicket( ) and OnSetSuperTicket( ) functions are used when a vote owner needs to update either its super ticket or its global ticket to persistent storage (which could be local or remote). More details about super and global tickets are described later in the context of the bootstrap protocol.

Bootstrap Protocol

1. A node in the bootstrap phase will communicate with all the other voters in the system using the protocol described below. If at any moment, the node finds that some voter owner is already joined in the federation, it will complete the bootstrap phase and join the existing federation via such voter owner.
2. For shared vote, if the node is already an owner, renew it if necessary (depending on the last renew time). If the node is not the owner, try to acquire the ownership if there is no owner or the owner's lease is expired.
3. If a node already owns a majority quorum of super tickets, and the corresponding global ticket has expired, the node can bootstrap the federation. Embodiments can optionally send a message to every other vote owner to notify the vote owners of this change.
4. If the above is not met, and the node owns at least one super ticket 108, and there are at least a quorum of votes with an identifier numerically larger than this owned vote identifier (including the owner vote itself), a VoteTransferRequest is sent to every vote owner with a larger vote identifier (unless a request was sent earlier within a specified retry timeout). The purpose is to try to ask such owner to transfer their super tickets. Note that while in this example, a larger numerical identifier is used as the determining factor, other embodiments may use other factors, such as smaller numerical identifiers, time stamps applied to votes, or other factors. In particular, use of the identifier in this fashion is arbitrary.
5. If 4 is not met, the node will periodically send VotePing messages to other voter owner to see whether such owner is already joined in the federation.
6. When a VoteTransfer Request message is received, the node 102 will transfer its own super ticket (if not transferred to some other node), and all the super tickets it owns to the requesting node. Note that if the receiver is already passed the bootstrap phase, no transfer is needed and a reply will be sent back to indicate that the node is already joined in the federation.

It is easy to see that as long as a quorum of votes are present in the system, the above protocol makes sure that at a certain point one node will own the quorum of super tickets and bootstrap the federation. Also note that the protocol contains some optimizations to avoid unnecessary message exchanges.

Bootstrap Examples

Suppose embodiments configure the nodes with node IDs 0, 1, 2, 3, and 4 to be seed nodes, the quorum will be 3 (majority quorum from 5 votes).

If embodiments start by booting only nodes 2 and 3, they will each own one vote (as configured). They will run the bootstrap protocol and node 3 will temporarily transfer its vote to node 2. However, node 2 will find that it does not yet have a quorum of votes so it will continue trying to send VoteTransferRequest messages to 4.

If embodiments then start node 5, node 5 will find that it does not own any votes. As a result, node 5 will simply try to send VotePing messages to nodes 2 and 3 and learn that both of them are also in bootstrap phase so 5 will remain in bootstrap phase as well.

If embodiments then start node 1, it will send VoteTransferRequest messages to nodes 2, 3 and 4, obtaining both votes (either both from node 2 or one each from nodes 2 and 3). Since node 1 has obtained ownership of a quorum of votes, it will start the new federation and initialize three new global leases—one for each owned vote.

When the other nodes (2, 3 and 5) send VotePing to node 1, they will find that 1 is already joined in the federation so they will complete the bootstrap phase and join the federation via node 1.

If embodiments start node 4 sometime later, then node 4 will send VotePing message to nodes 0, 1, 2 or 3 and from the response of any existing nodes it will move to joining phase.

All vote owners that have joined the federation will periodically issue new global leases for their votes.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
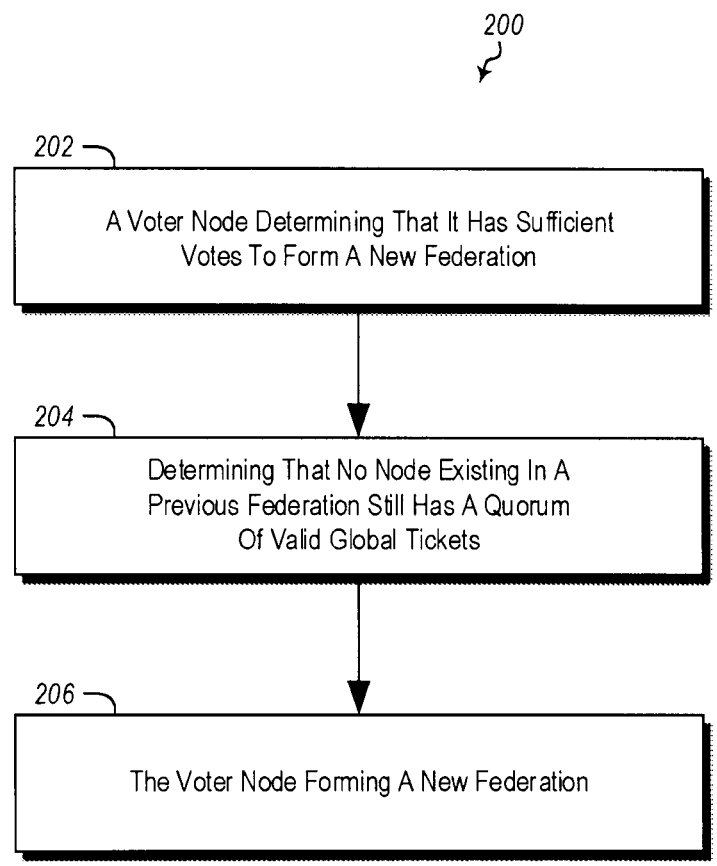
FIG. 2 illustrates a method of determining if a new federation should be formed.

Referring now to FIG. 2, a method 200 is illustrated. The method 200 includes acts for determining, in a federation, if a federation exists for a node to join or if a new federation should be formed. The method includes a voter node determining that it has sufficient votes to form a new federation (act 202). For example, a node 102-1 may receive votes from other voters, such as the node 102-2 and the shared voter 104 a sufficient number of votes such that the node 102-1 has a quorum of votes.

The method 200 further includes determining that no node existing in a previous federation already has a quorum of valid global tickets (act 204). This can detected by determining if there is a still a quorum of unexpired global tickets (which are persisted across node reboots). This node will wait for such a quorum of global tickets to expire. Each global ticket indicates that a node agrees that a federation should continue to exist. If a node does not have a quorum of global tickets, it will go down. Thus, if any nodes continue to live with a quorum of global tickets, embodiments wait until a sufficient number of global tickets expire such that the node(s) will go down.

The method 200 further includes the voter node forming a new federation (act 206). In particular, the voter node will begin to issue global tickets.

The method 200 may be practiced where other voters that transferred their votes to the voter node such that the voter node is able to have sufficient votes persist indications that their votes were transferred to the voter node. For example, as illustrated above, nodes 102 and shared voters 104 issue super tickets where the super tickets indicate when a vote expires. The super ticket can be persisted by the voters such that each of the voters knows when their votes expire.

The method 200 may be practiced where all nodes in the federation comprise global tickets from a quorum of other nodes in the federation. In particular, each node in a federation must have a quorum of global tickets from other nodes indicating that the network can exist. If any node does not have a sufficient number of global tickets, then the node will drop out of the network and/or shut down.

The method 200 may further comprising determining that the voter node does not have sufficient votes to form a federation and as a result requesting votes from other voters for votes to obtain the sufficient votes. In such an example, a voter node determining that it has sufficient votes to form a new federation is performed as a result of the voter node receiving votes from other voters in response to requesting votes from other voters. For example, as illustrated above, if a node wants to start a federation, but does not have the votes to do so, the voter node can send a VoteTransferRequest.

In some embodiments when the voter node requests a vote from a shared voter, the shared voter can indicate that a different node owns the shared voter's vote.

Voters providing votes maintain their state. The state includes an expiration time of the vote, to what node their vote was given, and in the case of node voters, the expiration of their own global ticket.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or stopping computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented by a voter node in a federation environment, of determining that a new federation should be formed, the method comprising:
   a first voter node in the federation environment determining that it has a majority quorum of votes needed to form a new federation, the determination comprising the first voter node identifying a plurality of vote proxies stored in a vote proxy component at the first voter node, each vote proxy representing a corresponding vote in the federation environment using a single interface that is common across all different vote authority types, regardless of a vote authority type of an entity casting the corresponding vote, the plurality of vote proxies comprising (i) a first vote proxy corresponding to a first node vote of the first voter node, (ii) a second vote proxy corresponding to a second node vote of a second voter node, and (iii) a third vote proxy corresponding to an external vote of a shared voter comprising a non-node device, wherein one of the first voter node or the second voter node owns the external vote on behalf of the shared voter, wherein the shared voter has a different vote authority type than each of the first voter node and the second voter node, and wherein each of the first node and the second node instantiates a corresponding vote proxy for each of the first vote proxy corresponding to the first node vote, the second vote proxy corresponding to the second node vote, and the third vote proxy corresponding to the external vote;
   the first voter node determining that no node existing in a previous federation still has a quorum of valid global tickets, each global ticket indicating that a voter agrees that a federation should continue to exist; and
   as a result, the first voter node forming the new federation.

2. The method of claim 1, wherein other voter nodes have transferred their votes to the first voter node such that the first voter node is able to have at least majority quorum of voter nodes persist indications that their votes were transferred to the first voter node.

3. The method of claim 1, wherein each node in the federation environment stores global tickets from a quorum of other nodes in the federation environment.

4. The method of claim 1, further comprising:
   the first voter node determining that it does not have the majority quorum of votes needed to form the new federation; and
   as a result, the first node requesting votes from other voters in order to obtain the majority quorum of votes,
   wherein the first voter node determining that it has the majority quorum of votes needed to form the new federation is performed as a result of the first voter node having received the votes from the other voters in response to having requested the votes from the other voters.

5. The method of claim 4, wherein the first voter node requesting the votes from the other voters comprises:
   the first voter node requesting the external vote from the shared voter; and
   as a result, the first voter node receiving from the shared voter an indication that the second voter node owns the external vote.

6. The method of claim 1, wherein all voters that provide votes maintain state, wherein the state for each voter comprises:
   (i) an expiration time of the voter's vote;
   (ii) to what node the voter's vote was given; and
   (iii) in the case of voter nodes, an expiration time of the voter's own global ticket.

7. The method of claim 1, further comprising:
   when a routing token changes, the first voter node checking whether it has lost or gain ownership for any external vote.

8. A computer system, comprising:
   one or more processors; and
   one or more computer readable media, wherein the one or more computer readable media comprise computer executable instructions that are structured to configure the computer system as a first voter node that includes a vote manager component, wherein the vote manager component is configured to:
      determine that the first voter node has a majority quorum of votes to needed form a new federation, the determination comprising identifying a plurality of vote proxies stored in a vote proxy component at the first voter node, each vote proxy representing a corresponding vote in the federation environment using a single interface that is common across all different vote authority types, regardless of a vote authority type of an entity casting the corresponding vote, the plurality of vote proxies comprising (i) a first vote proxy corresponding to a first node vote of the first voter node, (ii) a second vote proxy corresponding to a second node vote of a second voter node, and (iii) a third vote proxy corresponding to an external vote of a shared voter comprising a non-node device having a vote authority type that is different from vote authority types of either the first voter node or the second voter node, wherein one of the first voter node or the second voter node owns the external vote on behalf of the shared voter, and wherein each of the first node and the second node instantiates a corresponding vote proxy for each of the first vote proxy, the second vote proxy, and the third vote proxy;
      determine that no node existing in a previous federation still has a quorum of valid global tickets, each global ticket indicating that a voter agrees that a federation should continue to exist; and
      as a result, form the new federation.

9. The computer system of claim 8, wherein the first voter node has at least a majority quorum of voter nodes persist indications that their votes were transferred to the first voter node, based on other voter nodes having transferred their votes to the first voter node.

10. The computer system of claim 8, wherein each node in the federation environment stores global tickets from a quorum of other nodes in the federation environment.

11. The computer system of claim 8, wherein the vote manager component is also configured to:
determine that the first voter node does not have the majority quorum of votes needed to form the new federation; and
as a result, request votes from other voters in order to obtain the majority quorum of votes,
wherein the vote manager component is configured to determine that the first voter node has the majority quorum of votes needed to form the new federation as a result of the first voter node having received the votes from the other voters in response to having requested the votes from the other voters.

12. The computer system of claim 11, wherein, when requesting the votes from the other voters, the vote manager component is configured to:
request the external vote from the shared voter; and
as a result, receive from the shared voter an indication that the second voter node owns the external vote.

13. The computer system of claim 12, wherein all voters that provide votes maintain state, wherein the state for each voter comprises:
(i) an expiration time of the voter's vote;
(ii) to what node the voter's vote was given; and
(iii) in the case of voter nodes, an expiration time of the voter's own global ticket.

14. The computer system of claim 8, wherein the vote manager component is also configured to check whether the first voter node has lost or gain ownership for any external vote when a routing token changes.

15. A computer program product comprising one or more hardware storage devices having stored thereon computer executable instructions that are structured such that, when executed by at least one processor of a computing system, the computer executable instructions configure the computing system as a first voter node in a federation environment, including computer executable instructions that configure the computing system to perform at least the following:
determine that the first voter node has a majority quorum of votes to needed form a new federation, the determination comprising identifying a plurality of vote proxies stored in a vote proxy component at the first voter node, each vote proxy representing a corresponding vote in the federation environment using a single interface that is common across all different vote authority types, regardless of a vote authority type of an entity casting the corresponding vote, the plurality of vote proxies comprising (i) a first vote proxy corresponding to a first node vote of the first voter node, (ii) a second vote proxy corresponding to a second node vote of a second voter node, and (iii) a third vote proxy corresponding to an external vote of a shared voter comprising a non-node device, wherein one of the first voter node or the second voter node owns the external vote on behalf of the shared voter, wherein the shared voter has a different vote authority type than each of the first voter node and the second voter node, and wherein each of the first node and the second node instantiates a corresponding vote proxy for each of the first vote proxy, the second vote proxy, and the third vote proxy;
based on determining that the first voter node has a majority quorum of votes to needed form a new federation identify that no node existing in a previous federation still has a quorum of valid global tickets, each global ticket indicating that a voter agrees that a federation should continue to exist; and
as a result of the identification, form the new federation.

16. The computer program product of claim 15, wherein the first voter node has at least a majority quorum of voter nodes persist indications that their votes were transferred to the first voter node, based on other voter nodes having transferred their votes to the first voter node.

17. The computer program product of claim 15, wherein each node in the federation environment stores global tickets from a quorum of other nodes in the federation.

18. The computer program product of claim 15, also including computer executable instructions that configure the computing system to:
determine that the first voter node does not have the majority quorum of votes needed to form the new federation; and
as a result, request votes from other voters in order to obtain the majority quorum of votes,
wherein the vote manager component is configured to determine that the first voter node has the majority quorum of votes needed to form the new federation as a result of the first voter node having received the votes from the other voters in response to having requested the votes from the other voters.

19. The computer program product of claim 18, also including computer executable instructions that configure the computing system to perform at least the following when requesting the votes from the other voters:
request the external vote from the shared voter; and
as a result, receive from the shared voter an indication that the second voter node owns the external vote.

20. The computer program product of claim 15, wherein all voters that provide votes maintain state, wherein the state for each voter comprises:
(i) an expiration time of the voter's vote;
(ii) to what node the voter's vote was given; and
(iii) in the case of voter nodes, an expiration time of the voter's own global ticket.

* * * * *